United States Patent [19]

Liberman et al.

[11] 3,769,454

[45] Oct. 30, 1973

[54] METHOD AND APPARATUS FOR TESTING TELETYPEWRITER TERMINALS

[75] Inventors: Richard A. Liberman, Statford; William C. Bond, Norwalk; Edwin J. Soltysiak, Westhaven, Conn.

[73] Assignee: General Datacomm Industries, Inc., Norwalk, Conn.

[22] Filed: Nov. 1, 1971

[21] Appl. No.: 194,270

[52] U.S. Cl. .............. 178/58, 179/2 DP, 179/175.3

[51] Int. Cl. .............................................. H04l 5/14

[58] Field of Search ................. 179/175 R, 175.1 R, 179/175.11, 175.3, 175.2 R, 175.25, 2.0 P; 325/363; 178/58 R

[56] References Cited

UNITED STATES PATENTS

| | | | |
|---|---|---|---|
| 3,571,530 | 3/1971 | Davies | 179/175.2 R |
| 3,655,915 | 4/1972 | Liberman | 179/175.1 R |
| 3,622,877 | 11/1971 | MacDavid | 325/363 |

OTHER PUBLICATIONS

Bell System Data Communication Technical Reference Manual, "Data Set 103f Interface Specification," Corp. American Telephone and Telegraph Co., 1964.

*Primary Examiner*—Kathleen H. Claffy
*Assistant Examiner*—David L. Stewart
*Attorney*—Dean S. Edmonds et al.

[57] ABSTRACT

A method and apparatus are provided for the automatic testing of a data communication terminal and a data communication link to which the terminal is connected. A conventional data set or modem in the terminal to be tested is modified to permit the terminal to be inserted automatically into a test loop, to be switched from the answer (ANS) mode of operation to the originate (ORIG) mode, and to be returned to normal operation. Fail-safe operation is provided to remove the terminal from the test loop if a failure occurs; and a wide range of test functions can be exercised.

11 Claims, 14 Drawing Figures

METHOD AND APPARATUS FOR TESTING TELETYPEWRITER TERMINALS

BACKGROUND OF THE INVENTION

The present invention is related to data communication systems and more specifically to apparatus and methods for testing such systems. Related patent applications are Ser. No. 35,454, filed May 7, 1970 by R. A. Liberman and S. J. Davis entitled "Closed Loop Test Method and Apparatus for Duplex Data Transmission Modem" now U.S. Pat. No. 3,655,915, issued Apr. 11, 1972, and Ser. No. 170,428, filed Aug. 10, 1971 by S. J. Davis entitled "Closed Data Loop Test Method and Apparatus for Data Transmission Modem," both of which are assigned to General DataComm Industries and are hereby incorporated by reference.

In modern computer systems, data is often transmitted many hundreds of miles through a variety of signal amplifying, switching, and processing equipment. Because of the complexity of the system and expensive charges for its use, it is becoming increasingly important for an operator to be able to check the operating integrity of the data communication system and, in the event of failure, to identify the point of breakdown as rapidly and precisely as possible.

A key element in modern data communication systems is a modulating device called a data set or modem. Such a device converts a D.C. signal representative of a stream of digital data, which may be received from any type of digital data-processing machine, into an A.C. signal representative of this same stream of digital data. In many modems that are presently used with data communication systems, one of the two D.C. levels that represent digital data is converted by a modem to an A.C. signal having a first frequency while the other level of the D.C. signal is converted to an A.C. signal having a second frequency. It is conventional in the art to refer to one of these D.C. levels and the corresponding A.C. frequency as a SPACE or "0" and to the other D.C. level and the corresponding A.C. frequency as a MARK or "1."

Because modems are so commonly used at the terminal ends of data communication systems, it is desirable to have automatic control means available for testing the communication system and the modem. Such testing, however, is complicated by the fact that modems have two different modes of operation, called the originate (ORIG) and answer (ANS) modes, as will be detailed below. To test both these modes automatically some way must be found to switch a modem automatically from one mode to the other. In addition, because the test procedure is automatic, a fail-safe mechanism must be provided so that the modem is returned to normal operation if the test sequence should fail.

SUMMARY OF THE INVENTION

Accordingly, it is an object of our invention to provide a method and apparatus for automatically testing a data communication system.

It is a further object of our invention to provide a method and apparatus for automatically testing both the ORIG and ANS modes of a data communication system.

These and other objects of our invention are provided by modifications we make in a conventional terminal of the data communication system and a procedure that we follow to test the system. Following the teaching of the aforementioned Davis application Ser. No. 170,428, we provide means for detecting the presence of a signal at a carrier frequency and upon such detection for closing a test loop that links the receiving and transmitting portions of the modem on the digital data side. Simultaneously this apparatus disables certain portions of the modem that might otherwise disconnect the remote terminal during the course of the test sequence. In addition, we modify the modem so that it will switch automatically from the ANS mode of operation to the ORIG mode of operation by altering the effect of a timing device called the abort-timer and providing a switch that inserts the modem into the ORIG mode. As a result of these modifications, it is possible to test a modem automatically in its ANS mode of operation, to change the modem to its ORIG mode of operation and to test it in that mode. Moreover, if there should be a failure in the test sequence, means are provided to remove the modem from the test loop.

BRIEF DESCRIPTION OF THE DRAWING

These and other objects, features, and elements of our invention will be more readily apparent from the following detailed description of the drawing in which.

DETAILED DESCRIPTION OF THE DRAWING

Figures 1, 2:
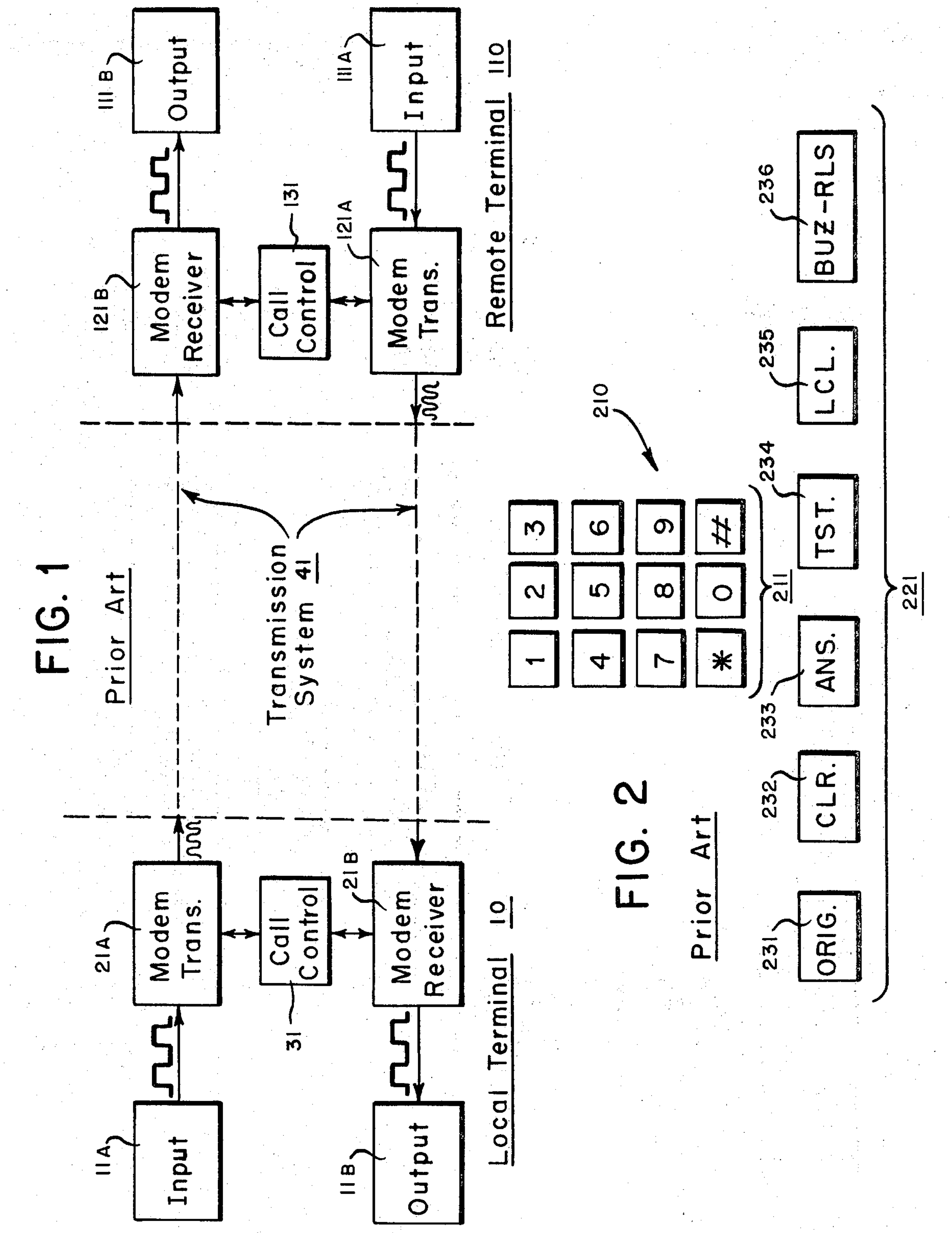
FIG. 1 is a simplified functional block diagram illustrating a typical data communication system of the prior art.
FIG. 2 is an illustration of the control panel of a conventional data set or modem of the prior art.

As shown in FIG. 1, a typical prior art two-wire data communication system comprises a local terminal 10, a transmission system 41, and a remote terminal 110. This system is designed so that information may both be transmitted from local terminal 10 to remote terminal 110 and transmitted from remote terminal 110 and received at local terminal 10. If transmission and reception of information can be carried on simultaneously at the terminals, the system is described as a duplex transmission system. If the system provides for transmission and reception at the terminals but not simultaneously, the communication system is a half-duplex transmission system.

Local terminal 10 comprises a source of digital data, identified as input 11A, a modem transmitter 21A, a modem receiver 21B, an output 11B for digital data, and a call control device 31 that monitors the operation of modem transmitter 21A and modem receiver 21B. Transmission system 41 may be a conventional telephone or teletype network including couplers located at the terminals, transmission lines, switching devices, repeaters, and the like. Remote terminal 110 is identical to local terminal 10 and the elements of remote terminal 110 bear the same numbers as the corresponding elements of local terminal 10 incremented by one hundred.

Digital data input 11A and output 11B typically is a teletypewriter machine (TTY) operating either by itself or in conjunction with a computer. In this case, it will be recognized that input 11A may be a tape reader or a keyboard and associated circuitry for generating digital data representative of information that is typed; and output 11B may be a tape writer or typewriter. Teletypewriters are available in many models with a general classification of these machines into three-row TTY's that transmit information at the rate of 60 words per minute (wpm) using a signal 22 milliseconds long to represent a bit of digital data and four-row TTY's that transmit information at 100 wpm using a signal 9 milliseconds long to represent a bit of digital data. All of these devices may be operated by an attendant and some of them permit automatic operation as well.

As indicated above, the purpose of the modems in the terminals is to convert digital data to a form suitable for transmission in a conventional telephone system and to convert information that has been transmitted through the telephone system back to digital data. In addition, the modems provide control means for the transmission system and means for controlling the inputs and outputs of digital data. Extensive description of the operation of modems may be found in James Martin's book *Telecommunications and the Computer* (Prentice Hall, 1969) and in the Bell System data communications technical reference entitled "Characteristics of Teletypewriter Exchange Service" (September, 1970) available from: Engineering Director - Data Communications, American Telephone and Telegraph Company, 195 Broadway, New York, N.Y. 10007.

To minimize interference between signals that are transmitted from a terminal and the signals that are received at that terminal and to permit communication between more than two terminals, it is customary to transmit MARK and SPACE signals at frequencies that are centered about a first center frequency and to receive MARK and SPACE signals at frequencies that are centered about a second center frequency. Thus, the terminal from which data communication originates, which is said to be in the originate (ORIG) mode, uses a first center frequency $f_1$ for sending and a second center frequency $f_2$ for receiving. Simultaneously, a terminal that responds to the originating station, which is said to be in the answer (ANS) mode, must receive the first center frequency $f_1$ and send the second center frequency $f_2$. Typical values of the center frequencies $f_1$ and $f_2$ and of the frequencies for the $f_1$ MARK and SPACE signals and the $f_2$ MARK and SPACE signals are as folows:

| Originate (ORIG) Mode | Center Frequency | MARK | SPACE | Answer (ANS) Mode |
|---|---|---|---|---|
| Sending | $f_1$=1170 Hz | 1270 Hz | 1070 Hz | Receiving |
| Receiving | $f_2$=2125 Hz | 2225 Hz | 2025 Hz | Sending |

While these frequencies are presently used in data communication, it will be understood that they are only illustrative of the frequencies at which our invention may be practiced.

The typical control functions provided by a modem and a typical call control device may best be illustrated with reference to FIG. 2 which shows a control panel 210 of a typical Western Electric modem such as the series 101C modem. Control panel 210 comprises a conventional TOUCH TONE keyboard 211, a set 221 of push button keys, and a set of signal lights located under some of the push button keys. Set 221 includes an originate (ORIG) key 231, a clear (CLR) key 232, an answer (ANS) key 233, a test (TST) key 234, a local (LCL) key 235, and a buzzer release (BUZ-RLS) key 236. The set of signal lights includes an ORIG lamp, an ANS lamp, a TST lamp, and a LCL lamp located under the corresponding push button keys.

ORIG key 231 provides a means for initiating data communication from the local terminal. Operation of this key puts the modem in the ORIG mode. CLR key 232 provides a means for terminating data communication. ANS key 233 enables an operator to respond to the request from a remote terminal for the initiation of data communication. Operation of this key puts the modem in the ANS mode. TST key 234 provides for test circuits; and LCL key 235 separates the local terminal from the transmission system so as to provide for training, servicing, and other functions. BUZ-RLS key 236 is a means for turning off a buzzer that sounds when the paper supply in the typewriter is too low. Additional control functions are provided by a break (BRK) key located on the keyboard of the teletypewriter; and a break release (BRK-RLS) key that typically is located on the call control panel of the modem (not shown in FIG. 2). In addition, an end of transmission (EOT) key is located on the keyboard of four-row teletypewriters.

To initiate a call from local terminal 10 to remote terminal 110, an operator pushes ORIG key 213 on control panel 210. This turns on digital data input 11A and presents an off-hook signal to the telephone central office. It also selects $f_1$ as the center frequency at which data will be sent and $f_2$ as the center frequency at which data will be received. When the central office returns the dial tone, the operator may then dial on the TOUCH TONE set 211 the number of the remote terminal he wishes to engage. If a busy signal is received, the operator depresses CLR key 232 and local terminal 10 shuts down.

If the remote terminal and the interconnecting circuits are not busy, the telephone at the remote terminal rings. When an operator depresses ANS key 233 at the remote terminal or when the terminal is automatically answered, an off-hook signal is sent to the central office to which the remote terminal is connected and the ringing of the telephone stops. In addition, $f_2$ is selected as the center frequency at which data is sent and $f_1$ as the center frequency at which data is received. The remote terminal introduces a specified timing delay after going off-hook and then transmits an $f_2$ MARK signal toward the originating station. The originating station monitors the MARK signal for a specified length of time and then sends its own $f_1$ MARK signal toward the remote station. When this $f_1$ MARK is received at the remote terminal, it is monitored for a specified length of time after which the digital data input 111A at the remote terminal is activated and the appropriate station identification is sent back to the originating station. This procedure is called the hand shake operation. If an $f_1$ MARK signal is not received within a specified period of time at an automatic answering terminal, an abort-timer automatically disconnects the remote terminal.

Once hand shaking is complete, digital data may be sent from input 11A to modem 21A, be transmitted as frequency modulated information through system 41 to modem 121B, and be converted there back to digital information suitable for use in output 111B. Information may also be sent, either simultaneously or alternately as the case may be, in the opposite direction from the remote terminal to the local terminal.

Data communications may be interrupted temporarily by depressing the BRK key at the receiving station so as to send a BRAKE signal, which is a continuous SPACE signal of specified duration, to the transmitting station. This locks the transmitting station keyboard. Transmission may be resumed by depressing the BRK-RLS key.

Data communication may be terminated by several means. If CLR key 232 is depressed, a SPACE signal is transmitted for a specified period of time longer than the duration of the SPACE signal transmitted when the BRK key is depressed; and the transmitting terminal shuts down. The receiving terminal will disconnect upon receiving this signal. Alternatively, with four-row TTY's, depression of the EOT key transmits an EOT character and turns off the transmitting terminal. Receipt of the EOT signal at the remote terminal initiates the disconnection of that terminal. In addition, if the carrier signal fails for a specified period of time, the terminals are designed to disconnect automatically.

It is possible for terminals having a transmission capacity of 100 wpm to communicate with terminals having a capacity of 60 wpm. In this case, auxiliary apparatus is provided in the telephone system for converting signals from one TTY to the other and for accommodating the different rates of transmission. It is necessary in this case to signal the faster terminal when an overload condition is developed. This signalling is provided by a REST light that indicates to the operator that transmission should slow down. The signal that activates the REST light is a frequency shift tone called a RESTRAINT signal that warbles at 50 Hz between the frequency of a MARK signal and 50 Hz less. If the operator disregards the REST light or if an automatic transmitting station fails to stop, a BREAK signal is sent to the transmitting station followed, in some cases, by a RESTRAINT signal. The BREAK signal locks the keyboard to prevent further transmission. The RESTRAINT signal keeps the REST light on. If there is no reaction to the BRK signal, a disconnect signal that is a SPACE signal is sent to the transmitting teletypewriter.

In the past, a modem has been tested manually by depressing TST key 234 to create a loop from a test center through the modem and back to the test center. Alternatively, manual tests were made by depressing the ORIG key 213 and conducting tests with a remote terminal and by depressing ANS key 233 and conducting further tests with a remote terminal. In our invention we have discovered a method and apparatus for effecting such test procedures automatically.

Figure 3:
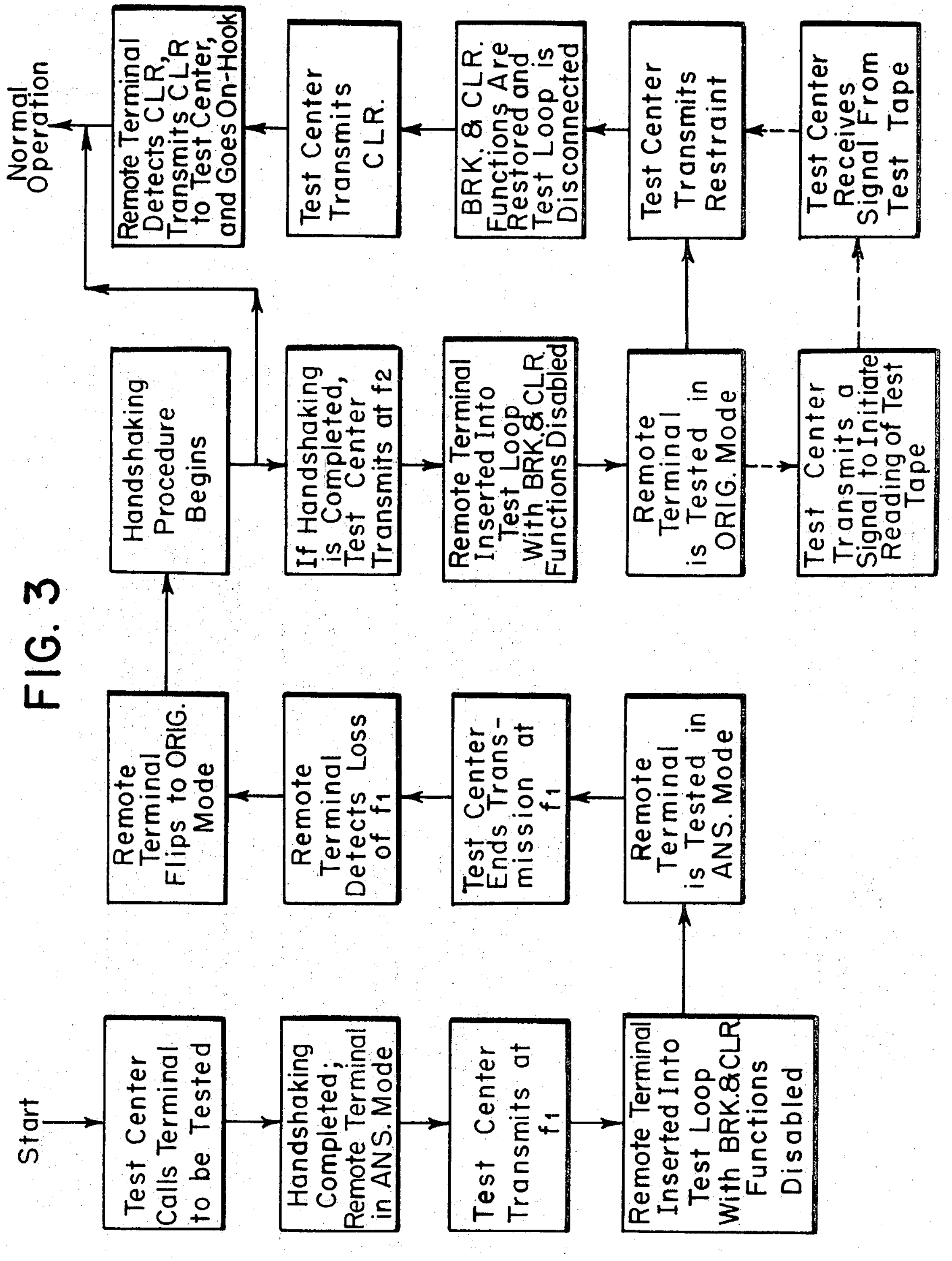
FIG. 3 is a flow chart depicting an illustrative test sequence according to our invention.

An illustrative test procedure is shown in block form in FIG. 3. As indicated in the upper left-hand corner, the test is initiated from a test center by calling the terminal to be tested. Handshaking is completed in the usual fashion; and the terminal to be tested is therefore placed in the ANS mode of operation. Once this is done, the test center transmits a signal at center frequency $f_1$ to the terminal to be tested. When this signal is recognized by the terminal, appropriate apparatus inserts the terminal into a test loop and disables the BRK and CLR functions. The remote terminal is then tested in the ANS mode following standard procedures using signals centered about center frequency $f_1$. Typically this testing involves at least determination of attenuation levels, frequency distortion, and bias distortion. Once testing is complete, the test center ends transmission of signals centered by $f_1$.

The remote terminal detects the loss of these signals and, after a brief interval described below, switches the terminal to the ORIG mode of operation. Shortly thereafter the remote terminal is removed from the test loop. Once the terminal is in the ORIG mode, the handshaking procedure commences. If hand skaking is completed, the test center transmits a signal at center frequency $f_2$. When this frequency is recognized by the remote terminal, it is inserted again into the test loop and the BRK and CLR functions are disabled. The remote terminal is then tested in the ORIG mode.

If the remote terminal has a tape reader that is on and a test tape in the reader, the test center then transmits a signal to initiate reading of the test tape. The signal from the test tape is then received by the test center.

Once the signal from the test tape is received, or if the remote terminal is not able to transmit such a signal, the test center transmits a RESTRAINT signal. This signal is recognized by the remote terminal as terminating the test procedure and it disconnects itself from the test loop and restores the BRK and CLR functions. The test center then transmits a CLR signal which is detected by the remote terminal. The remote terminal transmits a CLR signal back to the test center and goes on hook. At this point, normal operation of the terminal may be resumed.

If the test sequence fails while the remote terminal is being tested in the ANS mode, the modem will detect the loss of signal. By means of a procedure initiated by the abort-timer, the remote terminal is then inserted into the ORIG mode and removed from the test loop. Similarly, when the modem is being tested in the ORIG mode, failure of the test sequence results in loss of signal; and a procedure initiated by the abort-timer removes the terminal from the test loop. Additional apparatus may also be provided to remove the terminal from the ORIG mode. If there is a failure of the handshaking procedure that begins when the remote terminal enters the ORIG mode, the loss of signal is again detected; and the modem is returned to normal operation by the apparatus that removes the terminal from the ORIG mode or by apparatus in the remote terminal that is normally used to process a CLR signal. As a result, a fail-safe mechanism is provided to keep the modem from being left in the test loop by any failure in the test sequence.

To perform this test procedure, a test center is required at the terminal from which the test is to be conducted and the terminal to be tested must include circuitry for automatic operation of the test procedure. A typical test center is described in detail in the above-referenced Davis patent application. It need only be mentioned that such a test center must be able to provide the signals that put the terminal to be tested into a test loop and remove the terminal from the loop when the test is completed. Appropriate timing sequences will be evident from the Davis application.

Figure 4:
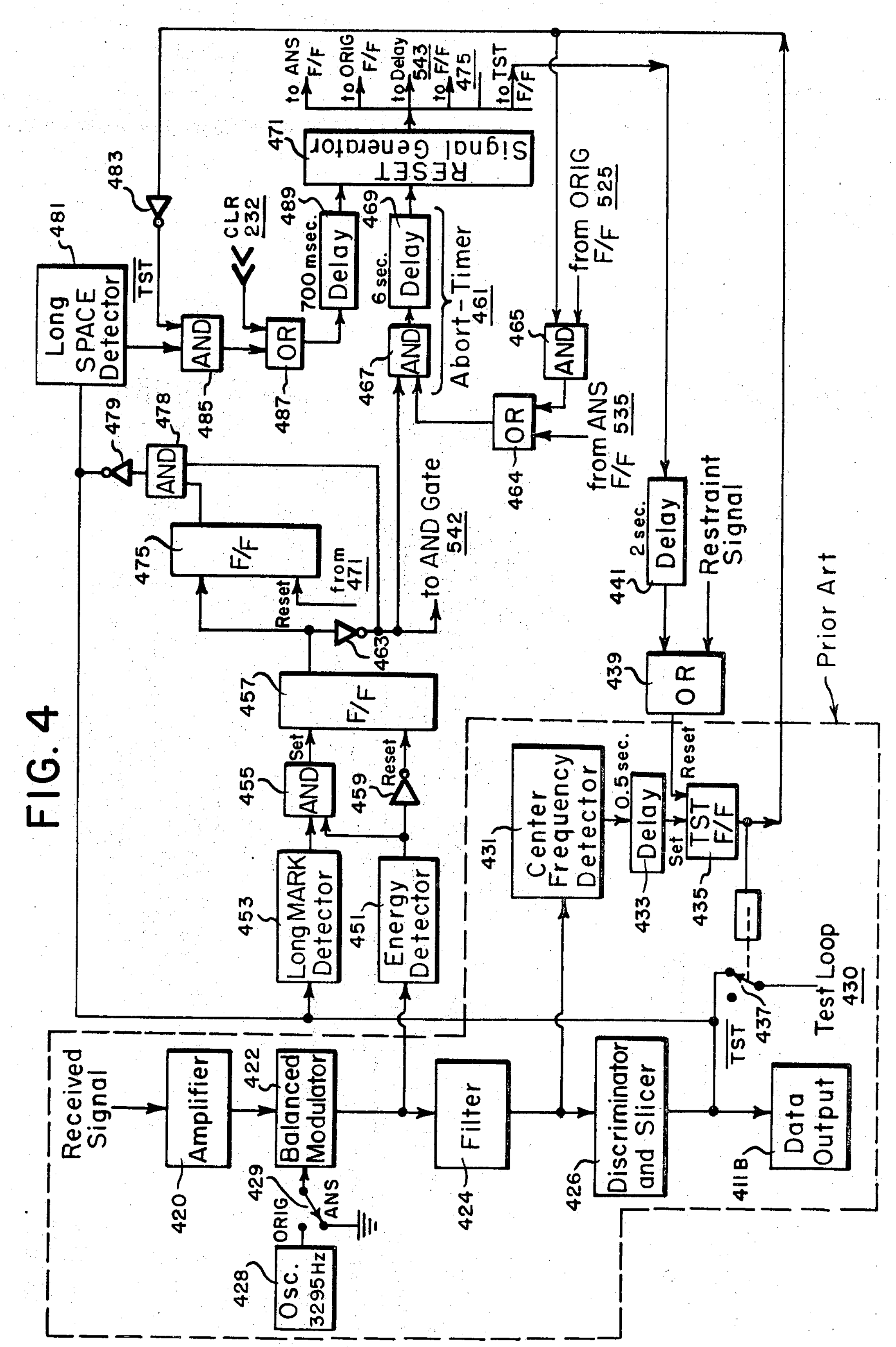
FIG. 4 is a schematic representation in block form of a first portion of illustrative apparatus used in practicing our invention.
Figure 5:
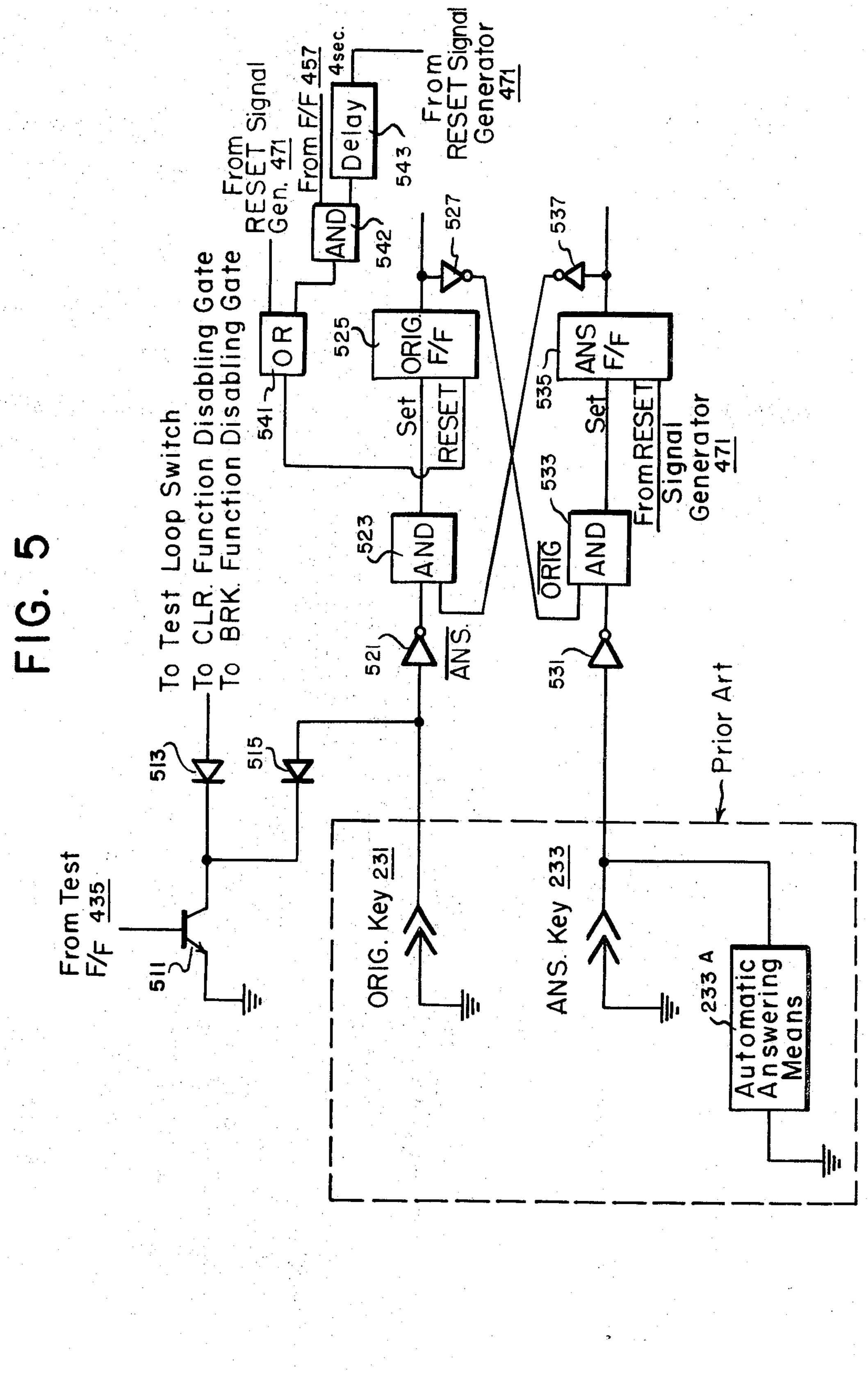
FIG. 5 is a schematic representation in block form of a second portion of illustrative apparatus used in practicing our invention.

The modifications that must be made in a terminal to permit its automatic testing are shown in the illustrative apparatus of FIGS. 4 and 5. The left-hand side of FIG. 4 illustrates typical apparatus used in our invention for processing a frequency modulated signal into a stream of digital data. A received signal is first amplified by an amplifier 420. It then passes through balanced modulator 422, a filter 424 and a discriminator and slicer 426. The resulting digital data is then fed to a data output 411B. The use of balanced modulator 422 and an oscillator 428 in processing the received signal is the subject of the aforementioned Liberman and Davis U.S. Pat. No. 3,655,915. Briefly, filter 424 has at least a 200 Hz pass-band centered at 1,170 Hz; and when the modem is in the ANS mode, the received signal has a center frequency $f_1$ of 1,170 Hz with $f_1$ SPACES and $f_1$ MARKS at 1,070 Hz and 1,270 Hz, respectively. Consequently, when a switch 429 disconnects oscillator 428, the received signal passes through modulator 422 and filter 424. When the modem is in the ORIG mode, the received signal has a center frequency $f_2$ equal to 2,125 Hz and therefore cannot be passed by filter 424. In this case, however, oscillator 428 is connected to balanced modulator 422; and because the frequency of oscillator 428 is 3,295 Hz, the difference frequency output from modulator 422 is centered on the pass-band of filter 424. As a result, only an oscillator, a modulator, a filter and a discriminator need be used to receive signals centered at both center frequencies $f_1$ and $f_2$.

As indicated above, the modem is inserted into a test loop 430 upon detection of a center frequency signal. Apparatus for detecting the center frequency is the same as that described in the aforementioned Davis patent application Ser. No. 170,428 and comprises a center frequency detector 431, an integrator or delay device 433, a TST flip-flop 435, and a switch 437. All this apparatus is conventional. Delay device 433 has a time constant such that it responds to the output of detector 431 in about one-half second and produces no output in response to shorter duration signals from detector 431. As a result, shorter duration MARK or SPACE signals are not erroneously interpreted as signals to connect the test loop.

The output of delay device 433 is used to set TST flip-flop 435 in an ON state that actuates switch 437 to connect the output of discriminator and slicer 426 to test loop 430. Siulataneously, this state of the flip-flop disables the BRK and CLR functions of the modem as is illustrated by the application of the signal $\overline{\text{TST}}$ to AND gate 485 in the CLR function circuitry.

To reset TST flip-flop 435 and thereby remove the modem from test loop 430, a RESET signal is applied to flip-flop 435. This signal restores the flip-flop to an OFF state in which switch 437 disconnects test loop 430 from the output of discriminator and slicer 426. As indicated in FIG. 4 and as discussed below, the RESET signal may be provided by RESET signal generator 471 or by a RESTRAINT signal.

Switching from the ANS mode to the ORIG mode and fail-safe protection is provided by circuitry that detects the loss of signal energy. This circuitry comprises an energy detector 451, a detector 453 for a MARK signal of relatively long duration (e.g., about one-fourth second), a flip-flop 457 and an abort-timer 461. When a long MARK signal is detected, AND gate 455 is enabled and flip-flop 457 is switched into an ON state. Upon failure of signal, energy detector 451 shuts off, thereby producing a signal that is inverted by inverter 459 to form a RESET signal that is applied to flip-flop 457 to restore it to its OFF state.

The output of flip-flop 457 is applied to inverter 463. The resulting inverted signal and a signal from OR gate 464 is applied to AND gate 467. As indicated, the inputs to OR gate 464 are signals from ANS flip-flop 535, which is shown in FIG. 5, and AND gate 465. The inputs to AND gate 465 are the outputs of ORIG flip-flop 525, which is also shown in FIG. 5, and TST flip-flop 435. If no energy is being detected by detector 451 and if the modem is in either the ANS mode or both the ORIG mode and the test loop, AND gate 467 is enabled and a signal is applied to delay device 469. Like delay device 433, delay device 469 responds to an input of a predetermined duration and produces no output in response to an input of a shorter duration. Illustratively, the time constant of delay device 469 produces a response after six seconds of input. Thus, when the modem is in either the ANS mode or both the ORIG mode and the test loop and signal fails for more than six seconds, a signal is applied by delay device 469 to RESET signal generator 471.

Generator 471 forms a RESET signal, typically a 100 millisecond pulse, that is applied to the reset inputs of various elements of the modem including ANS and ORIG flip-flops 535 and 525 and delay device 543 shown in FIG. 5 as well as TST flip-flop 435 and flip-flop 475 of FIG. 4. As indicated in FIG. 4, the signal applied to TST flip-flop 435 is first applied to a two second delay device 441. Unlike delay devices 433 and 469, which typically are integrating devices that require a fixed duration of charging before an output is produced, and produce no output if the required amount of charging is not attained, delay device 441 simply produces an output at a fixed period of time after it receives an input. From delay device 441, the RESET signal is then applied to an OR gate 439 from which it is applied to the reset terminal of TST flip-flop 435. The RESTRAINT signal is a second input to OR gate 439. The function of flip-flop 475 is described below.

Once AND gate 467 has been enabled but before six seconds have run, it is possible to turn off abort-timer 461 by a MARK signal that is relatively long in duration. This signal is detected by detector 453 and applied to AND gate 455 so as to trigger the set terminal of flip-flop 457. As a result, flip-flop 457 switches to an ON state. The signal from flip-flop 457 is inverted by inverter 463 and therefore disables AND gate 467. This terminates the input to delay device 469; and because six seconds have not run, no output is produced by delay device 469.

Apparatus for the modem's CLR function is also illustrated in block form in FIG. 4. Briefly, this apparatus comprises a detector 481 for detecting a SPACE signal of relatively long duration (e.g., about 0.7 second), AND gate 485, CLR key 232, OR gate 487, and delay device 489. If the modem is in the test loop, the signal $\overline{\text{TST}}$ is applied to AND gate 485, thereby disabling the gate. If, however, the modem is not in the test loop and a long SPACE signal is detected, AND gate 485 is enabled and a signal is applied through OR gate 487 to delay device 489. Delay device 489 is similar to delay device 441 and merely delays the application of the signal to RESET signal generator 471 for 0.7 second. Alternatively, a signal may be applied through delay device 489 to generator 471 by depressing CLR key 232.

In either case, during the time the signal is delayed by delay device 489, additional circuitry (not shown in FIG. 4) transmits a CLR signal and the modem goes on hook. After the delay period, the signal is applied to generator 471; and a RESET signal is produced by generator 471 that is the same as the signal produced in response to an input from delay device 469. This signal is then applied to the reset inputs of various elements in the modem to restore these elements to their quiescent state.

Additional fail-safe protection is provided by circuitry connected between long SPACE detector 481 and flip-flop 457. This circuitry comprises flip-flop 475, inverter 463, AND gate 478, and inverter 479. Its purpose is to turn the modem off if the received signal fails when the modem is not in the test loop. This circuitry is needed because the-abort timer 461 is enabled only if the modem is in the ANS mode or if the modem is both in the test loop and in the ORIG mode. The abort-timer is not enabled when the modem is only in the ORIG mode as it may be during hand shaking.

Flip-flop 475 is used to record the receipt of a long MARK signal by the modem. As indicated above, when such a signal is detected by detector 453, the output of flip-flop 457 is switched to the ON state. This also switches flip-flop 475 to the ON state. However, AND gate 478 remains disabled because the output of flip-flop 457 is also inverted by inverter 463. If the signal should fail, this failure is detector by detector 451 and flip-flop 457 is switched to the OFF state. This does not affect the output of flip-flop 475, which remains in the ON state; but it does change the signal applied through inverter 463 to AND gate 478. As a result, AND gate 478 is enabled. The output of this gate is then inverted by inverter 479 and applied to long SPACE detector 481. The purpose of inverting the signal from AND gate 478 is to make the signal correspond to that of a SPACE signal.

When SPACE detector 481 detects a long SPACE signal from inverter 479, it applies a signal to AND gate 485. As indicated above, if the modem is in the test loop, the signal $\overline{TST}$ disables AND gate 485. However, during the hand shake procedure, the modem may not be in the test loop in which case AND gate 485 is enabled. Consequently, a signal is applied through OR gate 487 and delay device 489 to RESET signal generator 471. As described above, during the time the signal is delayed by delay device 489, a CLR signal is transmitted and the modem goes on-hook. The RESET signal from generator 471 is then applied to the reset terminals of various elements in the modem to restore them to their quiescent state. The application of the RESET signal to the reset terminal of flip-flop 475 resets this flip-flop to its OFF state. This, of course, erases flip-flop 475 and prepares it to record the receipt of the next long MARK signal.

Apparatus for controlling the ANS and ORIG modes of the modem is shown in FIG. 5. This apparatus comprises a transistor 511, diodes 513 and 515, inverters 521, 527, 531 and 537, AND gates 523 and 533, ORIG key 231, an ORIG flip-flop 525, ANS key 233, an automatic answering means 233A, an ANS flip-flop 535, OR gate 541, AND gate 542 and delay device 543. Before a call is received, ORIG flip-flop 525 and ANS flip-flop 535 are both in the OFF state. As a result, AND gates 523 and 533 are both enabled.

To answer a call, either ANS key 233 is depressed to complete a circuit or the call is answered automatically by answering means 233A. The signal from these answering devices is inverted by inverter 531 and applied to AND gate 533. Because this gate is enabled, a SET signal is applied to ANS flip-flop 535 to switch this flip-flop into its ON state. An inverter signal formed by inverter 537 disables AND gate 523 and makes it impossible to switch the modem into the ORIG mode.

To remove the modem from the ANS mode, a RESET signal is applied to the reset terminal of ANS flip-flop 535. This RESET signal is supplied by RESET signal generator 471. The RESET signal restores ANS flip-flop 535 to its OFF state thereby enabling AnD gate 523.

If the modem is not in the ANS mode, the modem may be switched manually to its ORIG mode by ORIG key 231. It may also be switched automatically to its ORIG mode by the same signal that inserts the modem in the TST mode. The apparatus for accomplishing this is transistor 511 and diode 515. When TST flip-flop 435 is in its ON state, transistor 511 is switched ON thereby turning ON both diode 513, which inserts the modem in the test loop and disables the BRK and CLR functions, and diode 515. As a result, a signal is applied to inverter 521; and the inverted signal is applied to AND gate 523. If the modem is not in the ANS mode, AND gate 523 is enabled and a signal is applied to the set terminal of ORIG flip-flop 525 to switch this flip-flop into its ON state. Once ORIG flip-flop 525 is in its ON state, an inverted signal is formed by inverter 527 to disable AND gate 533 in the ANS circuitry.

To remove the modem from the ORIG mode a RESET signal from RESET signal generator 471 is applied to the reset terminal of ORIG flip-flip 525. This signal returns ORIG flip-flop 525 to its OFF state; and by means of the inverted signal applied by inverter 527, enables AND gate 533 in the ANS circuitry. The RESET signal is applied to the reset terminal of ORIG flip-flop 525 through OR gate 541. The inputs to OR gate 541 are two inputs from RESET signal generator 471, one of which also passes through a delay device 543 and an AND gate 542. Delay device 543 is similar to delay devices 441 and 489 in that it produces an output at a fixed period of time after an input signal is received. As a result, the same RESET signal is applied to ORIG flip-flop 525 at two different times.

The RESET signal is applied twice in order to provide additional fail-safe protection for removing the modem from its test condition. When the modem is not in the test loop, either signal applied from RESET signal generator 471 to OR gate 541 is sufficient to restore ORIG flip-flop 525 to its OFF state. However, when the modem is in the test loop, diode 515 is ON and a signal is constantly being applied to the set terminal of ORIG flip-flop 525 to switch it to the ON state. Because the RESET signal that removes the modem from the test loop is delayed two seconds by delay device 441 of FIG. 4, the modem is not removed from the test loop until after the first RESET signal reaches the reset terminal of ORIG flip-flop 525. Consequently, unless a second RESET signal is applied to the reset terminal of ORIG flip-flop 525 after the modem is removed from the test loop, the ORIG flip-flop would be left in the ON state.

The application of the same RESET signal at two different times to ORIG flip-flop 525 provides fail-safe protection for the test procedure in that it restores ORIG flip-flop to its OFF state even if the modem is in the test loop when signal fails. However, during a normal test, signal failure is intentionally used to produce a RESET signal that switches the modem from the ANS mode to the ORIG mode. In this case, the second RESET signal is not desired. Accordingly, the RESET signal from delay device 543 is applied through AND gate 542 to OR gate 541. The other input to AND gate 542 is the inverted output of flip-flop 457. Thus, the second RESET signal is applied to ORIG flip-flop 525 only if a long MARK signal has not been received or signal energy is not being received. These conditions prevail at the time the RESET signal is applied to AND gate 542 only if the test sequence has failed.

Figures 6A, 6B, 6C, 6D, 6E:
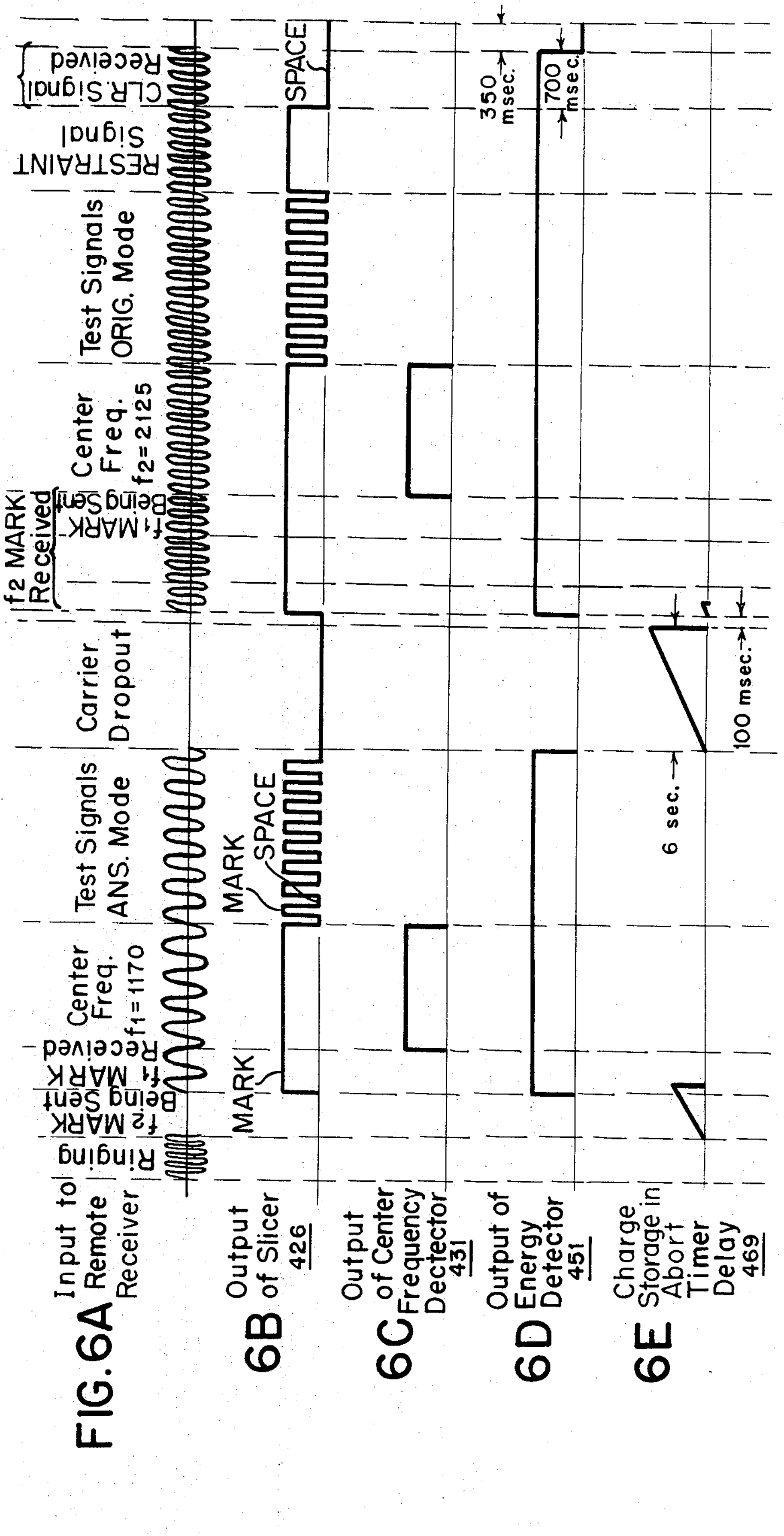
FIGS. 6A–6I are waveform and timing diagrams useful in understanding the operation and interrelation of the various elements of the illustrative apparatus of FIGS. 4 and 5.
Figures 6F, 6G, 6H, 6I:
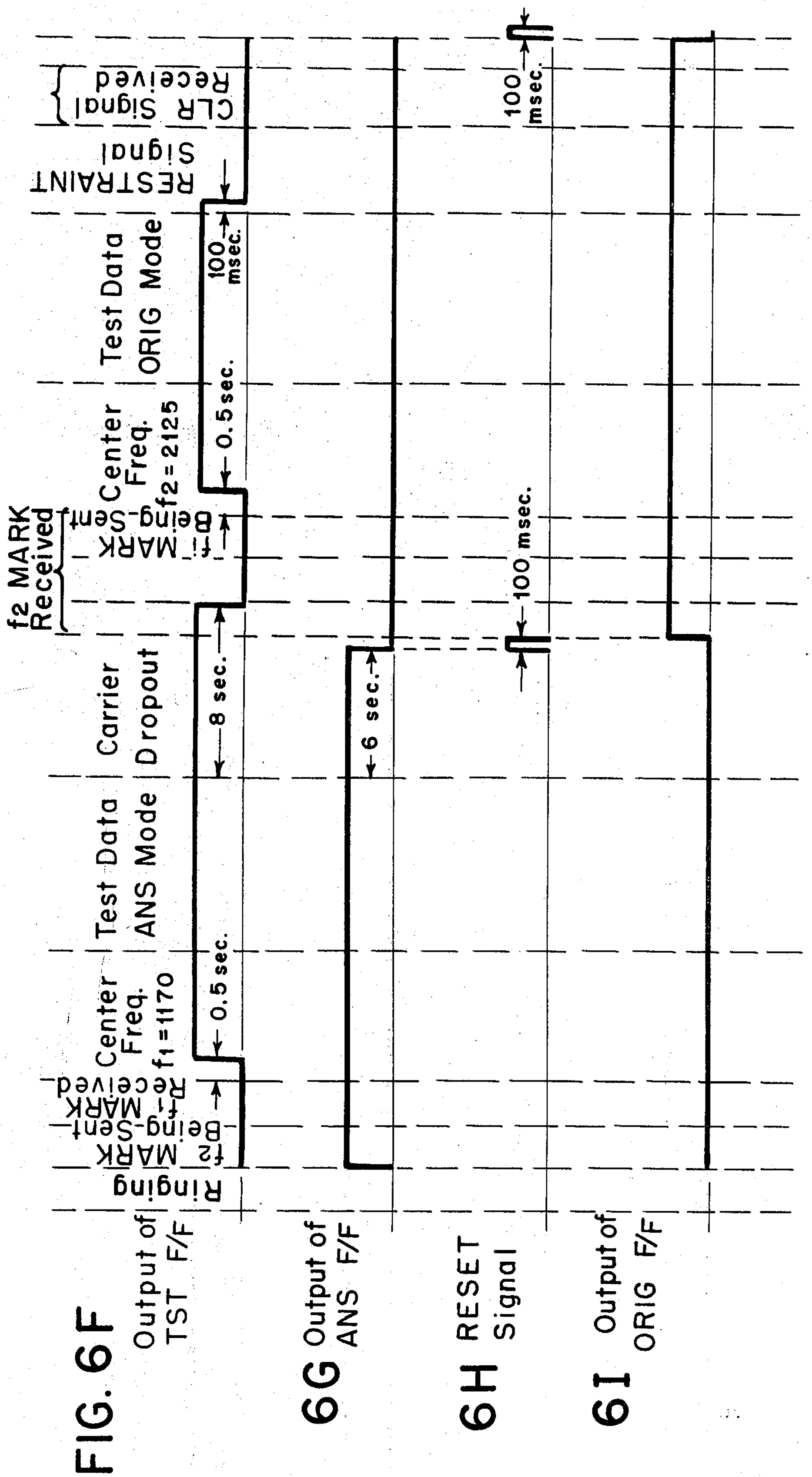

The use of the circuitry of FIGS. 4 and 5 in implementing the test procedure of FIG. 3 is best illustrated in conjunction with the timing diagrams of FIGS. 6A through 6I. Initially, the modem is in a quiescent state in which TST, ORIG, and ANS flip-flops 435, 525, and 535 are all in the OFF state. In addition, flip-flop 457 in the energy detecting circuitry and flip-flop 475 are also in the OFF state. When the test center rings the modem to be tested, an input is received at amplifier 420 as indicated by the presence of a signal in FIG. 6A. This signal is answered by inserting the modem into the ANS mode, as a result of which ANS flip-flop 535 is switched into the ON state as indicated in FIG. 6G. Simultaneously AND gate 523 in the ORIG circuitry is disabled and AND gate 467 in the energy detection circuitry is enabled. Because flip-flop 457 is OFF, the inverted signal applied to AND gate 467 by inverter 463 turns on abort-timer 461 as indicated in FIG. 6E. The act of putting the modem into the ANS mode also causes an $f_2$ MARK signal to be sent to the test center.

When an $f_1$ MARK is received from the test center, the signal energy is detected by energy detector 451 and the duration of the MARK signal is monitored by MARK detector 453. Energy detector 451 produces a signal that enables AND gate 455. When the duration of the MARK signal proves to be long enough, detector 453 produces a signal that is applied through AND gate 455 to set flip-flop 457 into its ON state. This state is inverted by inverter 463 to turn off AND gate 467 and thereby stop abort-timer 461 as shown in FIG. 6E before it can produce a response. At this point, a station identifying signal is sent and handshaking is complete.

The signal from flip-flop 457 also sets flip-flop 475 into its ON state. However, the inverter signal from inverter 463 also disables AND gate 478; and the output of flip-flop 475 has no effect at this time.

To initiate the test sequence, a carrier signal is transmitted from the test center to the remote terminal at center frequency $f_1$. This signal is detected by center frequency detector 431; and after a delay of approximately 0.5 seconds to insure the authenticity of the signal, a SET signal is applied to TST flip-flop 435. This switches TST flip-flop 435 into the ON state as shown in FIG. 6F. The signal from TST flip-flop 435 inserts the modem into the test loop, disables the BRK and CLR functions and also applies a signal to the ORIG circuitry that would insert the modem into the ORIG mode were it not for the fact that the modem was already in the ANS mode.

Once the modem is in the test loop, conventional tests may be carried out on the modem in the ANS mode.

Once these tests are complete, the modem is switched to the ORIG mode by dropping the signal centered about center frequency $f_1$. The absence of signal centered about this frequency is detected by energy detector 451; and a signal is formed by inverter 459 that resets flip-flop 457 to the OFF state. As a result, AND gates 467 and 478 are enabled. Because the modem is still in the test loop, the CLR function is still disabled; and the change in state of AND gate 478 has no effect. However, because the modem is still in the ANS mode, AND gate 467 is still enabled; and the signal applied from flip-flop 457 through inverter 463 turns on abort-timer 461 as shown in FIG. 6E. After six seconds of no signal, a signal is applied from delay device 469 to RESET signal generator 471.

Signal generator 471 produces a RESET signal that is applied to numerous elements of the modem circuitry including ANS flip-flop 535, ORIG flip-flop 525, flip-flop 475 and TST flip-flop 435. Typically, this signal is a pulse of approximately 100 milliseconds as shown in FIG. 6H. This signal resets ANS flip-flop 535 to its OFF state, thereby terminating the output of ANS flip-flop 535 as shown in FIG. 6G and enabling AND gate 523. The application of the signal to ORIG flip-flop 535 has little effect since this flip-flop is already in the OFF state. The RESET signal also restores flip-flop 475 to its OFF state thereby disabling AND gate 478.

Because the signal applied to TST flip-flop 435 is delayed for approximately two seconds by delay device 441, the modem is still in the test loop at the time AND gate 523 is enabled. Thus, transistor 511 and diodes 513 and 515 are all ON. As a result, a signal is applied through inverter 521 and AND gate 523 to the set terminal of ORIG flip-flop 525. This signal switches the modem into the ORIG mode as shown in FIG. 6I.

Thereafter, the signal applied through delay device 441 finally reaches the reset terminal of TST flip-flop 435 and switches it to the OFF state as shown in FIG. 6F. This turns off transistor 511 and diodes 513 and 515; but it does not affect the state of ORIG flip-flop 525 because a flip-flop does not drop out of the ON state upon loss of the signal that originally switched it into that state.

Once the modem is in the ORIG mode, handshaking may be initiated. First, the test center transmits $f_2$ MARK signal. When this signal is detected by energy detector 451 and MARK detector 453, flip-flop 457 is turned ON, thereby turning ON flip-flop 475 and disabling AND gates 467, 478 and 542. Simultaneously, an $f_1$ MARK is sent back to the test center.

The $f_2$ MARK signal that initiates handshaking does not have to be received by the modem as soon as it is switched to the ORIG mode. In practice, however, it is convenient to switch the test center immediately from transmission at ANS mode test frequencies centered about center frequency $f_1$ to transmission at the $f_2$ MARK frequency. At the time this switch is made, this is detected as a loss of signal energy because the modem is still in the ANS mode and oscillator 428 is disconnected by switch 429. When the modem is switched to the ORIG mode, oscillator 428 is connected and the $f_2$ MARK is detected immediately. As shown in FIG. 6E, during the brief time required to detect the $f_2$ MARK signal, abort-timer 461 is ON because the modem is in both the ORIG mode and the test loop, a condition that enables AND gate 467.

Once handshaking is complete, the test center transmits a signal on carrier frequency $f_2$. This signal is detected by center frequency detector 431; and after a delay of 0.5 seconds is used to switch TST flip-flop 435 to the ON state as shown in FIG. 6F. As a result, the modem is inserted into the test loop and the BRK and CLR functions are disabled. The modem may then be tested in the ORIG mode following standard test procedures.

Once this phase of the test is completed, the tape reader of the modem may also be tested if there is a test tape already in the reader and if the reader is ON. The test center merely transmits a signal "X ON," to the modem to initiate reading of the test tape, and it then monitors the signal received from the test tape.

To remove the modem from the test loop, the test center then transmits a RESTRAINT signal. This signal is applied through OR gate 439 to reset terminal of TST flip-flop 435. As a result, the flip-flop is switched to its OFF state and the modem is removed from the test loop. Simultaneously, the BRK and CLR functions are enabled.

To terminate the call, the test center then transmits a CLR signal which is a SPACE signal of approximately 0.7 seconds duration. This signal is detected by detector 481 for a period of about 0.35 second before a signal is applied to AND gate 485. Because TST flip-flop 435 is now in the OFF state, AND gate 485 is enabled; and this signal is applied through OR gate 487 to delay device 489. During the 0.7 seconds the signal is delayed in delay device 489, a CLR signal is transmitted back to the test center and the modem goes on hook. After 0.7 seconds, the signal is applied to RESET signal generator 471. A 100 millisecond pulse is then produced by generator 471 and is applied to the various elements in the modem circuitry to restore them to their quiescent state. At this point, normal operation has been restored.

If there is a failure to receive a signal at any time, this will be detected by energy detector 451. If the modem is in the ANS mode, abort-timer 461 will be turned on; and if a signal is not received within 6 seconds, a RESET signal will be produced that will switch the various flip-flops to their OFF state. When the modem is in the ANS mode and the test loop, the effect of the delay in the application of the RESET signal to TST flip-flop 435 will be to insert the modem into the ORIG mode. If AND gate 542 is not disabled by receipt of a long MARK signal, the delayed RESET signal applied to ORIG flip-flop 525 through delay device 543 will then remove the modem from the ORIG mode. In the same fashion, if the modem is in the ORIG mode and also in the test loop at the time signal fails, abort-timer 461 and signal generator 471 will produce a RESET signal that will remove the modem from the test loop and a delayed RESET signal will switch ORIG flip-flop to its OFF state.

If the received signal should fail during the hand shake operation that takes place just after the modem is switched to the ORIG mode, the modem will be restored to normal operation either by the delayed RESET signal formed as a result of failure of the ANS mode frequencies or by the operation of the CLR function circuitry. Which of these mechanisms will first operate depends on the time that the signal failure takes place and the delays in the signal detection circuitry and the various delay devices. If the received signal should fail at any time before the RESET signal applied to delay device 543 reaches AND gate 542, AND gate 542 will be enabled; and the RESET signal applied through delay device 543 will switch ORIG flip-flop 525 to the OFF state. On the other hand, if the received signal fails after the RESET signal reaches AND gate 542 and before the modem is inserted in the test loop, And gates 478 and 485 are enabled. Consequently, the operation of long SPACE detector 481 and its associated circuitry will generate a RESET signal that will switch ORIG flip-flop 525 to its OFF state.

As will be obvious to those skilled in the art, there are numerous ways to implement our invention. The apparatus shown here is only illustrative and alternative apparatus can be devised. For convenience of illustration, switches 429 and 437 have been shown as mechanical devices, but it will be recognized that these switches preferably are implemented using conventional electronic circuitry. The various AND and OR gates and flip-flops shown in the illustrative embodiments of our invention can be implemented im many ways known to circuit designers using positive or negative logic; and our invention is not limited to the particular combinations we have shown above.

The frequencies at which MARKS and SPACES are transmitted and received may, of course, be changed and evident modifications may be made in the apparatus to accommodate these changes. The various timing delays that we have illustrated are only illustrative and many other delays may prove suitable in various applications. It is necessary, however, in practicing our invention that the RESET signal applied to the TST flip-flop be delayed long enough that the ORIG flip-flop may be inserted into the ON state. If fail-safe switching of ORIG flip-flop 525 to its OFF state is desired, it is also necessary that the delayed RESET signal be delayed long enough by delay device 543 that the modem is removed from the test loop before the delayed RESET signal is applied to the reset terminal of ORIG flip-flop 525.

Numerous other modifications may be made to the preferred embodiments described and illustrated herein without departing from the invention as defined in the claims.

We claim:

1. A method for testing a data transmission modem from a remote location comprising the steps of:

completing handshaking between apparatus at the remote location and the modem, the modem being in an answer (ANS) mode of operation;

establishing from the remote location a test loop between receiving said transmitting portions of the modem on its digital data side;

testing the modem in the ANS mode;

shifting the modem from the remote location into an originate (ORIG) mode;

testing the modem in the ORIG mode; and disconnecting the test loop from the remote location and reestablishing normal operation.

2. The method of claim 1 wherein:

the step of establishing a test loop also establishes a condition that would put the modem into the ORIG mode if the modem were not in the ANS mode, whereby the modem is conditioned to be switched into the ORIG mode automatically upon being removed from the ANS mode; and the step of shifting the modem into the ORIG mode comprises the step of removing the modem from the ANS mode while it is still in the test loop, whereby the modem is in the test loop at the time it is switched into the ORIG mode.

3. The method of claim 2 wherein the step of establishing a test loop further comprises the step of inactivity break (BRK) and clear (CLR) functions of the modem.

4. The method of claim 1 further comprising the steps of:

removing the modem from the test loop after it is shifted into the ORIG mode; and re-establishing from the remote location the test loop between receiving and transmitting portions of the modem after the modem is shifted into the ORIG mode and before it is tested in that mode.

5. A data transmission modem comprising:

first means for converting digital data signals into frequency modulated signals for application to a transmission medium;

second means for converting frequency modulated signals from said transmission medium into digital data signals;

said first and second signal converting means together being operable in either an originate (ORIG) mode or an answer (ANS) mode of operation;

first circuit means for preventing operation of the modem in the ORIG mode of operation when the first and second signal converting means are being operated in the ANS mode;

second circuit means for selectively interconnecting said first and second means on the digital data side to establish a test loop and for selectively disconnecting said test loop, both in response to a signal received over said transmission medium;

characterized by third circuit means for automatically establishing the ORIG mode of operation once the test loop is established by the second circuit means and the first and second signal converting means cease to operate in the ANS mode.

6. The data transmission modem of claim 5 wherein:

the first circuit means comprises a logic gate that is rendered inoperative when the modem is operated in the ANS mode;

the second circuit means comprises a flip-flop that establishes the test loop when it is in one of its two states; and the third circuit means comprises a connection from the flip-flop of the second circuit means to the logic gate of the first circuit means that applies to the logic gate a signal having one level when the flip-flop is in one of its two states and a different level when it is in its other state.

7. The data transmission modem of claim 6 further characterized by:

a timer that causes a RESET signal to be applied to a reset terminal on said flip-flop in the second circuit means;

an energy detector that detects energy in a signal received by the modem; and logic circuitry that activates said timer upon the detection of loss of energy whenever th modem is in the ANS mode of operation or whenever the test loop is established and the modem is in the ORIG mode of operation.

8. The method of claim 4 wherein the step of removing the moden from the test loop after it is shifted into the ORIG mode is accomplished automatically as part of a process in which the modem is first removed, from the remote location, from the ANS mode while it is still in the test loop.

9. A method for testing a data transmission modem from a remote location comprising the steps of:

completing handshaking between apparatus at the remote location and the modem, the modem being in an answer (ANS) mode of operation;

establishing from the remote location a test loop between the receiving and transmitting portions of the modem on its digital data side;

testing the modem in the ANS mode; and disconnecting the test loop from the remote location and reestablishing normal operation;

wherein the improvement comprises:

shifting the modem from the remote location into an originate (ORIG) mode before the test loop is disconnected; and testing the modem in the ORIG mode.

10. The method of claim 9 wherein the improvement further comprises the steps of:

establishing at the time the test loop is created a condition that would put the modem into the ORIG mode if the modem were not in the ANS mode, whereby the modem is conditioned to be switched into the ORIG mode automatically upon being removed from the ANS mode; and removing the modem from the ANS mode while it is still in the test loop, whereby the modem is in the test loop at the time it is switched into the ORIG mode.

11. The method of claim 9 wherein the improvement further comprises the steps of:

removing the modem from the test loop after it is shifted into the ORIG mode; and reestablishing from the remote location the test loop between receiving and transmitting portions of the modem after the modem is shifted into the ORIG mode and before it is tested in that mode.

* * * * *